UNITED STATES PATENT OFFICE.

PIERRE GERMAIN, OF CLERMONT-FERRAND, FRANCE.

DYNAMITE.

SPECIFICATION forming part of Letters Patent No. 427,679, dated May 13, 1890.

Application filed July 8, 1889. Serial No. 316,831. (No specimens.)

*To all whom it may concern:*

Be it known that I, PIERRE GERMAIN, of Clermont-Ferrand, in the Department of Puy de Dome, Republic of France, have invented a new and useful Improvement in Dynamite or Explosive Compounds of Nitro-Glycerine, which improvement is fully set forth in the following specification.

This invention relates to the absorbent material in dynamite for holding the nitro-glycerine or highly-explosive liquid; and it consists in the use for this purpose of spongy vegetable matter, such as the pith of elder and other plants, the porous parts of cocoa-nut-husks, spongy agaric, or the like. This matter, subdivided into particles of proper size, I compress and hold under pressure to prevent exudation of the explosive liquid. It is very light and highly absorbent, with great power of resisting the action of corrosive liquids. Ordinarily lightness is considered a defect in dynamite; but this not at all because a heavy absorbent material is desirable. In the new or improved dynamite the nitro-glycerine is of such density and enters the compressed spongy matter in such proportion that the density of the dynamite thus obtained is much greater than that of water. This spongy material as it exists in the crude state I purify and lighten by removal of the incrustating and woody matter associated with it, and thus increase its compressibility and absorptive power.

In my application of even date, Serial No. 316,830, I have described a process of preparing the spongy vegetable matter, of which I will here give a briefer description.

The tender stalks of elder, large rushes, paulownias, and other pithy plants are cut before the wood has hardened and rasped into a coarse powder, of which fifty parts are boiled for about an hour in a solution containing about two and a half parts of carbonate of soda and forty-seven and a half parts of water. The spongy matters are separated by levigation from the denser woody parts and are washed, then pressed or squeezed to remove the wash-water, and dried. Cocoa-nut-husks may be treated in a similar way, the long fibers being first carded off. Spongy agaric is sliced and the slices flattened, heated with soda solution, washed, squeezed, and dried. This spongy matter, or these spongy matters, freed from incrustating and denser woody matters and in coarse powder, are compressed and caused to absorb the explosive liquid or nitro-glycerine. According to the degree of compression, there may be obtained by imbibition dynamite having from seventy-six to ninety-three per cent. of nitro-glycerine and from twenty-four to twenty-seven per cent. of inert absorbent.

It is preferable and more simple to press the inert absorbent into cartridges and then cause it to absorb the nitro-glycerine or explosive liquid. The latter may, however, be first absorbed and the product then compressed; but in this case one should introduce just the desired quantity of nitro-glycerine, so that no accidental exudation will take place.

With my absorbents the more consistent the dynamite desired the less should be the quantity of nitroglycerine absorbed; also assuming that the proportions of nitro-glycerine and of inert absorbent are from seventy-six to ninety-three of the first and from twenty-four to twenty-seven of the second, and that the density of the dynamite obtained should be the highest possible, the spongy matter should be reduced to its smallest volume capable of retaining without exudation one of the proportions indicated.

The vegetable pith may be used in the form of cylindrical sticks extracted from the stalks, washed in hot lye, then cut into pieces of the desired length, compressed into impermeable cartridge-cases, and made to absorb nitro-glycerine.

It is to be remarked that as well with sawdust of pith and cocoanut-husk as with the pith cylinders, compression is advantageous in that with the non-compressed spongy substances the absorbed nitro-glycerine distributes itself over a larger surface and exudes more easily under an accidental pressure than if the absorbent had been previously reduced to its minimum volume.

I claim as my invention or discovery—

1. The improvement in dynamite, consisting in the herein-specified absorbent material saturated or impregnated with the explosive liquid or nitro-glycerine, said material being spongy cellular vegetable tissue contradistinguished from the fibrous and woody growths of plants by its superior lightness, porosity, and elastic compressibility, and characterized also by a high resistance to corrosive liquids, substantially as described.

2. The improvement in dynamite, consisting in the herein-specified absorbent material in a state of compression saturated or impregnated with the explosive liquid or nitro-glycerine, said material being spongy cellular vegetable tissues contradistinguished from the fibrous and woody growths of plants by its superior lightness, porosity, and elastic compressibility, and characterized also by a high resistance to corrosive liquids, substantially as described.

3. The improvement in dynamite, consisting in the herein-specified absorbent material with its cell-walls of artificially-reduced solidity or thickness, saturated or impregnated with the explosive liquid or nitro-glycerine, said material being spongy cellular vegetable tissue contradistinguished from the fibrous and woody growths of plants by its superior lightness, porosity, and elastic compressibility, and characterized also by a high resistance to corrosive liquids, substantially as described.

4. The improvement in dynamite, consisting in the herein-specified absorbent material with its cell-walls of artificially-reduced solidity or thickness and in a state of compression saturated or impregnated with the explosive liquid or nitro-glycerine, said material being spongy cellular vegetable tissue contradistinguished from the fibrous and woody growths of plants by its superior lightness, porosity, and elastic compressibility, and characterized also by a high resistance to corrosive liquids, substantially as described.

5. The new or improved explosive composition or dynamite, consisting of an explosive liquid or nitro-glycerine and the herein-specified absorbent material in small pieces, said material being spongy cellular vegetable tissue contradistinguished from the fibrous and woody growths of plants by its superior lightness, porosity, and elastic compressibility, and characterized also by its high resistance to corrosive liquids, substantially as described.

6. The new or improved composition or dynamite, consisting of an explosive liquid or nitro-glycerine and the herein-specified absorbent material in small pieces, and also in a state of compression, said material being spongy cellular vegetable tissue contradistinguished from the fibrous and woody growths of plants by its superior lightness, porosity, and elastic compressibility, and characterized also by its high resistance to corrosive liquids, substantially as described.

7. The new or improved explosive composition or dynamite, consisting of an explosive liquid or nitro-glycerine and the herein-specified absorbent material in small pieces, with the cell-walls of artificially-reduced solidity or thickness, the said material being spongy cellular vegetable tissue contradistinguished from the fibrous and woody growths of plants by its superior lightness, porosity, and elastic compressibility, and characterized also by a high resistance to corrosive liquids, substantially as described.

8. The new or improved explosive composition or dynamite, consisting of an explosive liquid or nitro-glycerine and the herein-specified absorbent material in small pieces, with the cell-walls of artificially-reduced solidity or thickness, and also in a state of compression, the said material being spongy cellular vegetable tissue contradistinguished from the fibrous and woody growths of plants by its superior lightness, porosity, and elastic compressibility, and characterized also by a high resistance to corrosive liquids, substantially as described.

In testimony whereof I have signed this specification in the presence of two subscribing witnesses.

PIERRE GERMAIN.

Witnesses:
  A. POLLOK,
  R. G. PRESTON.